No. 865,948. PATENTED SEPT. 10, 1907.
W. G. SCHAEFFER.
COMBINED LUGGAGE CARRIER AND STAND.
APPLICATION FILED APR. 30, 1906.

WITNESSES:
J. O'R. Kelly
Geo. Miller

Wm. G. Schaeffer, INVENTOR
BY
Ed. A. Kelly, ATTORNEY.

THE NORRIS PETERS CO., WASHINGTON, D. C.

UNITED STATES PATENT OFFICE.

WILLIAM G. SCHAEFFER, OF READING, PENNSYLVANIA, ASSIGNOR, BY MESNE ASSIGNMENTS, TO READING STANDARD COMPANY, A CORPORATION OF PENNSYLVANIA.

COMBINED LUGGAGE-CARRIER AND STAND.

No. 865,948.     Specification of Letters Patent.     Patented Sept. 10, 1907.

Application filed April 30, 1906. Serial No. 314,404.

*To all whom it may concern:*

Be it known that I, WILLIAM G. SCHAEFFER, a citizen of the United States, residing at Reading, in the county of Berks and State of Pennsylvania, have invented certain new and useful Improvements in a Combined Luggage-Carrier and Stand, of which the following is a specification.

This invention relates to a combined luggage carrier and bicycle stand and is intended for use more particularly on bicycles, motor cycles, and like vehicles. The object being to provide a convenient, light and neat looking luggage carrier and one that may be used with equal facility as a stand or support for the rear wheel of a bicycle.

The device consists of a frame of metal secured to the axle of the rear wheel in such a manner that it may be used when in one position as a luggage carrier and when swung down on its pivotal connection with the axle, will serve as a stand for the bicycle.

My invention is more fully described in the following specifications and clearly illustrated in the accompanying drawing, in which:—

Figure 1:
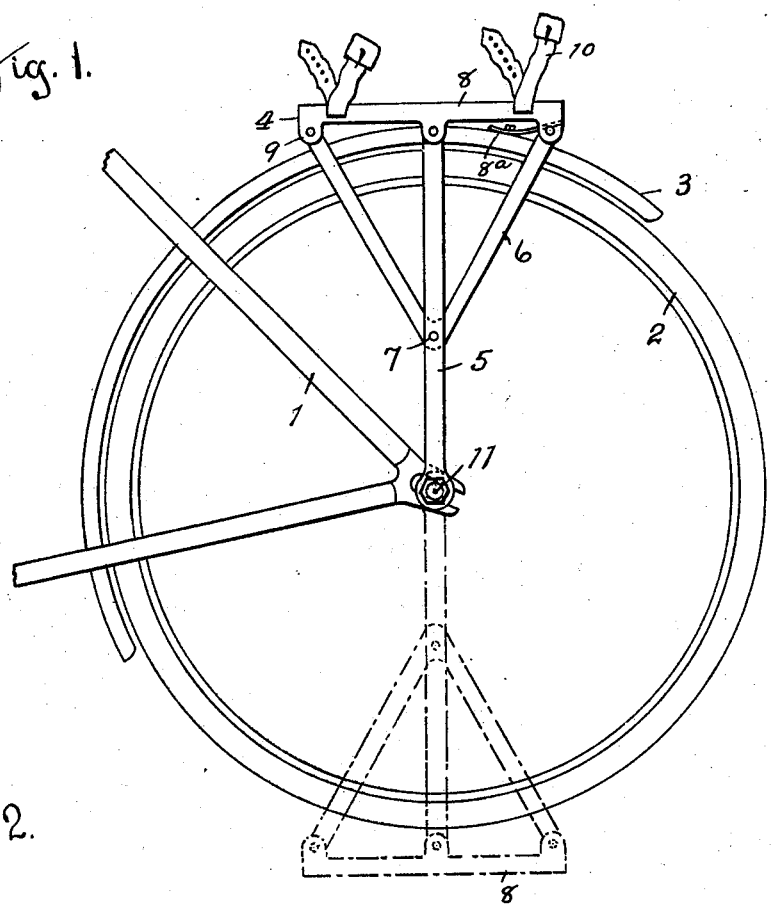
Figure 2:
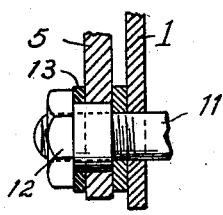

Figure 1 shows an elevation of the rear wheel and a portion of the frame of a bicycle with my device in position. Fig. 2 is a detail view of the axle connection.

The numeral 1 designates the rear end of a bicycle frame.

2 designates the wheel and 3 the mud guard.

The numeral 4 designates my carrier and stand. This stand comprises a metal frame composed of a vertical member 5 and a V-shaped member 6 secured thereto at its lowest point 7, at a position thereon that will bring its upper ends in horizontal alinement with the top of the member 5, making approximately a Y-shaped frame. One of these frames depend on either side of the wheel and a suitable platform 8 is held between these frames. This platform is formed with depending ears 9 by means of which the ends of the members 5 and 6 are secured thereto by pins. This platform may be provided with straps 10 for securing luggage thereto and with a tongue $8^a$ on its under side, by means of which it may be secured to the mud guard 3 to insure rigidity, when in position as a carrier.

The lower ends of the vertical members 5 are pivotally secured to the axle 11. In Fig. 2 I have shown the construction of this pivot. The nut 12 is formed with a cylindrical body over which the end of the member 5 fits. A leather washer 13 is interposed between the under side of the head of the nut and the surface of said member, and a suitable washer between it and the bicycle frame 1. By this construction the frame may be swung around on its pivotal connection without interfering with the wheel fastening. When the frame is swung down, to the position indicated by dotted lines in Fig. 1, it will permit the wheel to be raised from the ground and serve as a stand or support therefor.

Having thus fully described my invention, what I claim and desire to secure by Letters Patent is:—

In combination with a bicycle having a mud guard over its rear wheel, a combined luggage carrier and stand comprising members pivoted to the rear axle of the bicycle and on opposite sides of the rear wheel thereof, V-shaped members attached to the first said members, a platform connecting the ends of all of said members together, straps attached to said platform, and a tongue attached to said platform and adapted to engage the mud guard of the bicycle.

In testimony whereof I have signed my name to this specification in the presence of two subscribing witnesses.

WILLIAM G. SCHAEFFER.

Witnesses:
   ED. A. KELLY,
   J. O'R. KELLY.